Patented Jan. 24, 1933

1,895,382

UNITED STATES PATENT OFFICE

JOHN EDMUND GUY HARRIS, OF CARLISLE, ENGLAND, ASSIGNOR TO SCOTTISH DYES, LIMITED, OF GRANGEMOUTH, SCOTLAND

DIRECT DYEING WATER SOLUBLE STABLE DERIVATIVES OF VAT DYESTUFFS AND PROCESS OF MAKING THE SAME

No Drawing. Application filed October 19, 1925, Serial No. 63,548, and in Great Britain October 16, 1924.

This invention relates to the art of dyeing and the production of dyes and has for its main object to provide improvements in dyes and dyeing and more particularly the manufacture and use in dyeing and printing of stable and soluble derivatives of the hereinafter-described vat dyestuffs. These derivatives are intended to be used for direct dyeing and printing of animal and vegetable fabrics.

Among the dyestuffs to be treated by the new process may be mentioned:—

Indigoid vat dyestuffs including indigo and dichlor-dibrom-indigo;

Anthraquinone vat dyestuffs including zenzanthrone, indanthrone, flavanthrone, pyranthrone an anthraquinone acridone dyestuffs.

The invention in brief consists in a process for the production of derivatives of vat dyestuffs which comprises treatment of the vat dyestuff in suspension or solution in a suitable organic base in the presence of a metal with an alkyl sulphuric acid halide as a single stage process.

Several examples showing methods of carrying the invention into effect will now be given, all parts referred to in these examples being parts by weight unless otherwise specified. The examples may be divided into classes as follows:—

Class 1 comprising Examples (i) to (xiv) deals with the condensation of different dyestuffs with methyl sulphuric acid chloride;

Class 2 comprising Examples (xv) to (xxiii) shows the use of different metallic powders;

Class 3 comprises Examples (xxiv) to (xxvi) showing the use of different alkyl sulphuric acid halides;

Class 4 formed by Examples (xxvii) to (xxxi) shows the use of different tertiary bases and diluents;

In view of the large number of examples disclosed, for the sake of clarity applicant now summarizes the results in tabular form:—

| No. of example | Dyestuff starting material | Scientific name | Metal | Base | Alkyl sulphuric acid halide | Temp. | Colour of dyestuff derivative | Colour of alkaline extract |
|---|---|---|---|---|---|---|---|---|
| I | Caledon jade green | Dimethoxy dibenzanthrone | Zinc | Pyridine | Methyl | 60° | Dark red | Yellowish red |
| II | Caledon jade green | Dimethoxy dibenzanthrone | Zinc | Pyridine | Methyl | 70° | Dark red | Yellowish red |
| III | Caledon brilliant purple RR | Dichloriso-dibenzanthrone | Zinc | Pyridine | Methyl | 50° | Purple red | Crimson |
| IV | Caledon red BN | 1.2-anthraquinone-naphthacridone | Zinc | Pyridine | Methyl | 5-10° | Orange yellow | Yellow |
| V | Caledon green B | Nitrodibenzanthrone | Zinc | Pyridine | Methyl | 50° | Red brown | Red brown |
| VI | Caledon gold orange | Pyranthrone | Copper | Pyridine | Methyl | 60° | Orange yellow | Brown yellow |
| VII | Caledon blue R | N. dihydro-1.2'-2.1'-anthraquinoneazine | Zinc | Pyridine | Methyl | | Red violet | Red |
| VIII | Caledon yellow G | Flavanthrone | Zinc | Pyridine | Methyl | Below 50° | Blue black | Blue violet |
| IX | Caledon yellow G | Flavanthrone | Zinc | Pyridine | Methyl | 50-60° | Red | Orange red |
| X | Caledon yellow G | Flavanthrone | Copper | Pyridine | Methyl | 80° | Red | Orange red |
| XI | Indigo LL | Indigotin | Zinc | Pyridine | Methyl | 55° | Colourless | Colourless |
| XII | Helindone fast scarlet R | 5.5'-dibrom-6.6'-diethoxy-2.2'-bisthionaphthene | Zinc | Pyridine | Methyl | 55° | Yellowish white | Slightly yellow |
| XIII | Durindone blue 4B | 5.7.5'.7'-tetra-brom indigotin | Zinc | Pyridine | Methyl | 55° | Yellowish white | Slightly yellow |
| XIV | Brilliant indigo BASF.2B | 5.5'-dichloro-7.7'-dibromo-indigotin | Zinc | Pyridine | Methyl | | Greenish white | Green white |
| XV | Caledon jade green | Dimethoxy-dibenzanthrone | Iron | Pyridine | Methyl | 60° | Dark red | Yellowish red |
| XVI | Caledon jade green | Dimethoxy-dibenzanthrone | Cobalt | Pyridine | Methyl | 60° | Dark red | Yellowish red |
| XVII | Caledon jade green | Dimethoxy-dibenzanthrone | Copper | Pyridine | Methyl | 50° | Dark red | Yellowish red |

| No. of example | Dyestuff starting material | Scientific name | Metal | Base | Alkyl sulphuric acid halide | Temp. | Colour of dyestuff derivative | Colour of alkaline extract |
|---|---|---|---|---|---|---|---|---|
| XVIII | Caledon jade green | Dimethoxy-dibenzanthrone | Aluminium | Pyridine | Methyl | 60° | Dark red | Yellowish red |
| XIX | Caledon jade green | Dimethoxy-dibenzanthrone | Cadmium | Pyridine | Methyl | 60° | Dark red | Yellowish red |
| XX | Caledon jade green | Dimethoxy-dibenzanthrone | Tin | Pyridine | Methyl | 30° | Dark red | Yellowish red |
| XXI | Caledon jade green | Dimethoxy-dibenzanghrone | Antimony | Pyridine | Methyl | 60–65° | Dark red | Yelowish red |
| XXII | Caledon jade green | Dimethoxy-dibenzanthrone | Copper bronze | Pyridine | Methyl | 30° | Dark red | Yellowish red |
| XXIII | Caledon jade green | Dimethoxy-dibenzanthrone | Zinc and iron mixture | Pyridine | Methyl | 30° | Dark red | Yellowish red |
| XXIV | Caledon jade green | Dimethoxy-dibenzanthrone | Zinc | Pyridine | Ethyl | 40–45° | Dark red | Yellowish red |
| XXV | Caledon yellow G | Flavanthrone | Zinc | Pyridine | Ethyl | 50° | Blue green | Blue violet |
| XXVI | Indigo LL | Indigotin | Zinc | Pyridine | Ethyl | 55° | Colourless | Colourless |
| XXVII | Indigo LL | Indigotin | Zinc | Dimethylaniline | Methyl | 55° | Colourless | Colourless |
| XXVIII | Caledon jade green | Dimethoxy-dibenzanthrone | Zinc | Quinaldine | Methyl | 60° | Dark red | Yellowish red |
| XXIX | Indigo LL | Indigotin | Zinc | Quinoline | Methyl | 55° | Yellowish white | Yellowish whte |
| XXX | Caledon yellow G | Flavanthrone | Zinc | Pyridine (chlorbenzene as diluent) | Methyl | ---------- | Blue green | Blue violet |
| XXXI | Caledon blue R | N. dihydro-1.2'-2.1'-anthraquinoneazine | Zinc | Pyridine (carbon bisulphide as diluent.) | Methyl | Refluxed | Red violet | Red |

It has been found both by myself and other investigators that when methyl chlor-sulphonate is added to pyridine in presence of vat dyestuff there is the dyestuff ester even with theoretical yields in absence of acid and water.

I have been able to isolate in several cases from the melt, at the end of the condensation, well-defined products which are metallic, for example copper compounds of the tertiary base and the sulphuric acid esters of the dyestuff. These bodies are readily converted to sodium or other salts by treatment with hot alkali whereby the metal is split off and the base liberated.

CLASS 1: DIFFERENT DYESTUFFS

*Example (i)*

This deals with Caledon jade green, zinc dust, pyridine, methyl sulphuric acid chloride and no previous heating.

According to this 1 part by weight of dimethoxy-dibenzanthrone, 1 part of zinc dust and 8 parts of pyridine are mixed together by stirring in the cold for a few minutes. 2.7 parts of methyl sulphuric acid chloride are then run into the well-stirred mixture. The rate of addition is controlled so that the temperature does not rise above 60° C., which appears to be the most favourable, although lower or higher temperature obtained by slower or faster addition of the ester may be used. When the addition has been made the reaction mixture is stirred for a short time so as to ensure thorough contact between the various reagents. 10 parts of a solution containing 1.7 parts caustic soda are then run in slowly and with stirring, so that there is no further rise in temperature. The resulting mixture may then be distilled either under reduced pressure or in a current of steam at ordinary pressure for the recovery of the pyridine. The required stable derivative of the dyestuff is obtained as a dark red solid by extracting the residue from the distillation with about 16 parts of cold water and filtering.

The product appears to be the sodium salt of the disulphuric acid ester of dimethoxy dibenzanthrone having the following constitutional formula—

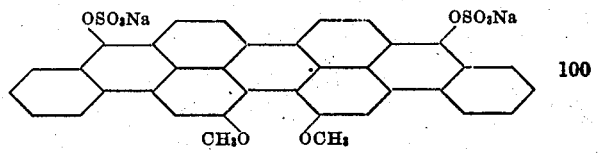

*Example (ii)*

This deals with Caledon jade green, zinc, pyridine, methyl sulphuric acid chloride and a commercial scale process.

Into a dry pan fitted with stirrer and cooler is charged 11.25 litres of dry light pyridine. With efficient cooling 1.25 litres of methyl sulphuric acid chloride are added over a period of 35–45 minutes or at such a rate that the temperature does not exceed 25–30°. An intimate mixture of 2.25 kilos of dry Caledon jade green powder (dimethoxy-dibenzanthrone) and 1.5 kilos of dry zinc dust is then added, 30–45 minutes being taken for this addition, the rate of the addition being so controlled that the temperature of 45° is not exceeded. To the well-stirred mixture are then added 2.25 litres of methyl sulphuric acid chloride at such a rate that the temperature slowly rises over a period of about 3 hours to 70°. The contents of the pan are now cooled to 20° and stirred into 150 lb. of cold water over a period of about 6 hours. The precipitated solid is now filtered off and well washed with cold water and finally extracted with 4 per cent. soda ash solution at 40°, the extraction being repeated until all the colour has been removed. From the extract thus obtained the dyestuff is precipitated by the addition of common salt. It is obtained as a purple red solid, readily soluble in cold water from which it will dye cotton, wool, silk and artificial silk salmon pink and red shades which may be developed to those of the original dyestuff by suitable acid oxidizing agents. This product appears to contain nitrogen and sulphur, the nitrogen presumably being present as an impurity. The product is apparently similar to that of Example i.

*Example (iii)*

This deals with Caledon brilliant purple RR, zinc dust, pyridine and methyl sulphuric acid chloride according to a commercial scale process.

To 11.25 litres of pyridine well stirred and cooled are added 1.125 litres of methyl sulphuric acid chloride at such a rate that the temperature does not exceed 25–30°. An intimate mixture of 2.25 kilos of Caledon brilliant purple RR powder (dichloro-isodibenzanthrone) and 2.25 kilos of zinc dust is then added at such a rate that the temperature does not exceed 25°. 2.25 litres of methyl sulphuric acid chloride are then added over a period of about 6 hours, the temperature not being allowed to exceed 50°. The resulting melt on cooling is poured into 150 lb. of cold well-stirred water. The precipitated solid is well washed with cold water and is then extracted with a 0.5 per cent. solution of sodium carbonate at 40° until the colour is extracted. If necessary a final extraction at 100° may be made. The combined extracts are treated with common salt, whereby the required dyestuff is precipitated as a red solid.

The product is apparently the sodium salt of the disulphuric acid ester of Caledon purple RR, having the following constitutional formula—

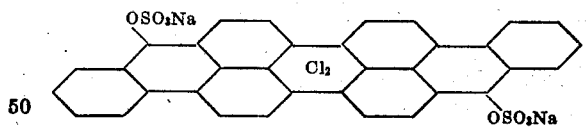

*Example (iv)*

This deals with Caledon red BN, zinc, pyridine and methyl sulphuric acid chloride at low temperature.

To 20 parts of dry pyridine. cooled by a water jacket, are added 3.3 parts of methyl sulphuric acid chloride. To the (quaternary salt) suspension thus formed, the vessel containing which is now surrounded by a freezing mixture of ice and salt, are added 3 parts of Caledon red BN powder (1:2-anthraquinone-naphthacridone) and 4 parts of zinc dust. 5 parts of methyl sulphuric acid chloride are now added to the mixture, which is well stirred throughout, at such a rate that the temperature never exceeds 5–10° C. The resulting orange melt is poured into 100 parts of ice water and stirred for half an hour. The precipitated orange yellow solid is filtered off and well washed with ice-cold water. It is then extracted by means of cold 0.5 per cent. sodium hydroxide solution. To the yellow solution thus obtained is added salt, whereby the stable soluble product is separated as brownish crystals which may be filtered off and dried. The stable soluble product dissolves easily in dilute aqueous acid and alkali. The dye in aqueous solution has a very good affinity for wool and natural silk, which are dyed lemon yellow. The addition of small amounts of acetic acid in the later stages of dyeing assists exhaustion. The affinity for cotton and artificial silk is less marked, but shades of great depth can be obtained by padding with very concentrated aqueous or alkaline solutions. The yellow dyeings thus obtained may be developed to those of the original dyestuff by oxidation with suitable acid oxidizing agents.

*Example (v)*

This deals with Caledon green B. zinc, pyridine, methyl sulphuric acid chloride and selective development of the dyeings produced with the product.

1 part of Caledon green B powder (nitrodibenzanthrone), 1.5 parts of zinc and 7 parts of pyridine are mixed together and well stirred. To the mixture is added 3.5 parts of methyl sulphuric acid chloride at such a rate that the temperature does not exceed 50°. The red-brown melt is poured into 70 parts of brine solution, by which is precipitated a red-brown solid containing the stable dyestuff. The dyestuff may be extracted by dilute alkali and salted out from the extract. It is soluble in water and from aqueous solution, it dyes wool and cotton brown shades. These give various shades according to the conditions of development. Thus, if boiled with 1 per cent. hydrochloric acid to which has been added a little sodium bisulphite the resultant shade is a green, corresponding to that of the original dyestuff. In the presence of ferric chloride and dilute hydrochloric acid various shades of blue and grey may be obtained according to the conditions. By boiling with dilute acid ferric chloride blacks may be obtained on wool and cotton.

*Example (vi)*

This deals with Caledon gold orange G and other pyranthrones, copper, pyridine and methyl sulphuric acid chloride.

1 part of methyl sulphuric acid chloride is added to 7 parts of dry pyridine, which is well stirred and cooled, so that the temperature does not exceed 30°. An intimate mixture of 1 part of Caledon gold orange G powder (pyranthrone) and 1 part of copper powder (98-99 per cent. copper content) is then added. With continued cooling and stirring the addition of 2 parts of methyl sulphuric acid chloride is made at such a rate that the temperature of the melt does not exceed 50°. At the end of the addition the temperature is raised to 60° and kept at this for 5 hours with continual stirring. The resulting orange-yellow melt is allowed to cool and is then stirred into 70 parts of cold water, whereby an orange-yellow solid is precipitated. This is removed by filtration and is extracted with hot dilute sodium hydroxide. To the extract is added salt, whereby the stable derivative separates as a brownish-yellow solid, easily soluble in warm water and dilute alkalies. It dyes cotton, wool, silk and artificial silk yellow shades which may be developed to the golden orange shade of the original dyestuff by means of suitable acid oxidizing agents such as for example acid ferric chloride solution.

The product is apparently the sodium salt of the di-sulphuric acid ester of pyranthrone having the following formula—

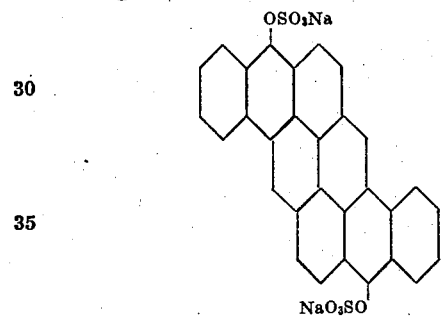

Other dyestuffs of the pyranthrone series may be dealt with on the lines of this example.

*Example (vii)*

This deals with Caledon blue R, zinc, pyridine and methyl sulphuric acid chloride on the lines of the preceding examples. In the case of Caledon blue R (N-dihydro-1:2 :2' :1'-anthraquinoneazine) a dark red violet compound is obtained.

Other indanthrone vat dyestuffs may be treated on the lines of the previous examples.

The product appears to be the sodium salt of the disulphuric acid ester of flavanthrone having the following formula—

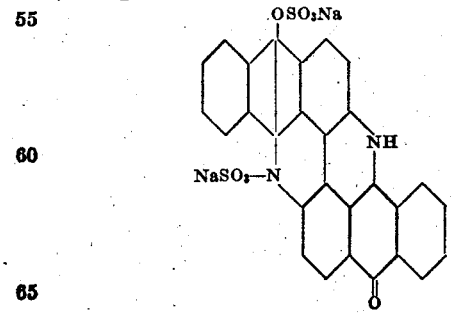

*Example (viii)*

This deals with Caledon yellow G and other flavanthrones, zinc, pyridine and methyl sulphuric acid chloride and a reaction temperature above about 50° C. to give a reddish derivative.

12.4 parts of methyl sulphuric acid chloride are slowly added during cooling and stirring to 30 parts of dry light pyridine. To this is added an intimate mixture of 5 parts of flavanthrone and 2 parts of zinc dust. The temperature of the mixture is then raised to 50-60° and stirring continued for 1 hour at this temperature. Thereafter the melt is poured into 400 parts of cold water containing 3 parts of finely divided chalk in suspension. The mixture is filtered and the residue containing the soluble product extracted with 500 parts of water at 70°, containing .5 parts of caustic soda. The extract is filtered hot and after cooling salt is added to the filtrate which causes the precipitation of the soluble dyestuff. The product is bright red in colour and is readily soluble in water, giving an orange-red solution which dyes cotton, wool and silk brilliant scarlet shades which can be developed to the original yellow of flavanthrone by immersion in a bath containing an acid oxidizing agent.

*Example (ix)*

This deals with Caledon yellow G and other flavanthrones, copper or copper bronze, pyridine and methyl sulphuric acid chloride and represents a particularly useful commercial process.

12.4 parts of methyl sulphuric acid chloride are added to 35 parts of dry light pyridine during cooling. An intimate mixture of 5 parts of flavanthrone and 3 parts of finely divided pure copper or copper bronze is added and the melt raised to 80° and maintained at this temperature for 15 minutes. The orange-yellow melt is then cooled and added to 44 parts of ammonia solution (S. G. .880) mixed with 50 parts of water. This mixture is then filtered and an orange-yellow paste is obtained which is extracted at a temperature of 60° with 500 parts of water containing 5 parts of caustic soda. The extract is filtered and to the bright orange-red filtrate salt is added, which causes the precipitation of the dyestuff in the form of a scarlet solid. This is readily soluble in water, producing an orange-red solution which dyes cotton, wool or silk brilliant scarlet shades. The original flavanthrone yellow is developed by after-treating the dyed material in a bath containing an acid oxidizing agent.

*Example (x)*

This deals with indigo, zinc, pyridine and methyl sulphuric acid chloride.

37½ parts of methyl sulphuric acid chloride are added to 200 parts of dry light pyridine. An intimate mixture of 20 parts of indigo powder and 30 parts of zinc dust is added to the reaction mixture. 75 parts of methyl sulphuric acid chloride are then slowly added during stirring and the reaction mixture is cooled with a freezing mixture of ice and salt. After all the methyl sulphuric acid chloride is added, the freezing mixture is removed, and the temperature of the melt slowly raised to 55° and maintained at this temperature for 15 minutes. After cooling the melt is poured into 500 parts of cold water and sufficient sodium carbonate added to the mixture to make it just alkaline. The pyridine is then removed by steam distillation and the light green mixture filtered hot. On cooling, the filtrate deposits yellow, needle-shaped crystals which are slightly soluble in cold water and readily soluble in hot. The residue from the filtration is extracted with a further quantity of hot water and filtered hot, whereby a further crop of crystals is obtained on cooling. The product may be recrystallized from water or preferably caustic soda solution; from the latter it is obtained in the form of yellow needles possessing no definite melting point and on ignition yields no ash, thus showing that it is not an alkali salt. Analytical examination gives the following figures:—

| | |
|---|---|
| Indigo | 38.7% |
| Sulphur | 9.46% |
| Sodium | Nil |
| Sulphate ash | Nil |
| Carbon | 52.19% |
| Hydrogen | 5.11% |
| Nitrogen | 8.27% |
| Water (when determined by heating in vacuo at 100–105° C.) | 6% |
| Atoms of sulphur per molecule of indigo | 1.99 |

The product is apparently the methyl pyridinium salt of the disulphuric acid ester of indigo having the following constitution—

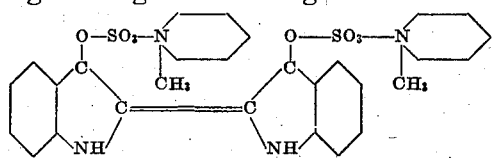

Material to be dyed is immersed in a hot solution of the soluble product, squeezed and the original blue shade of indigo regenerated by immersing the material in a bath containing an acid oxidizing agent.

*Example (xi)*

This deals with 5:5'-dibrom-6:6'-diethoxy-2:2'-bisthio-naphthen, zinc, pyridine and methyl sulphuric acid chloride.

7½ parts of methyl sulphuric acid chloride are slowly run into 40 parts of dry light pyridine and a mixture of 4 parts of 5:5'-dibrom-6:6'-diethoxy-bis-thio-naphthen-indigo and 6 parts of zinc dust is added. 15 parts of methyl sulphuric acid chloride are then slowly run in. The reaction mixture is stirred vigorously and cooled in a mixture of ice and salt. After all the methyl sulphuric acid chloride is added the melt is slowly raised to 55° and maintained at this temperature for 15 minutes. It is then poured into 200 parts of cold water and sufficient sodium carbonate added to render it just alkaline. The pyridine is removed by distillation in steam, after which the contents of the still are filtered hot. On cooling, the filtrate deposits a yellowish-white solid, which is isolated by filtration. It is slightly soluble in cold water and readily in hot, giving a slightly yellow solution. It can be recrystallized from water or caustic soda and a material is thus obtained yielding practically no ash on ignition. Material may be dyed by immersing it in this solution and subsequently developing in an acid oxidizing agent, whereby the original scarlet shade of the thio-indigo is obtained.

*Example (xii)*

This deals with halogenated indigo, zinc, pyridine and methyl sulphuric acid chloride.

7½ parts of methyl sulphuric acid chloride are slowly run into 40 parts of dry light pyridine and an intimate mixture of 4 parts of powdered 5:7-5':7'-tetra-brom-indigo and 6 parts of zinc dust added. 15 parts of methyl sulphuric acid chloride are slowly run in. The reaction mixture is vigorously stirred and cooled in a freezing mixture of ice and salt. After all the methyl sulphuric acid chloride is added the melt is raised to 55° and maintained at this temperature for 10–15 minutes. After cooling, the melt is poured into 200 parts of cold water and sufficient sodium carbonate added to make it just alkaline. The pyridine is removed by distillation in steam and thereafter the contents of the still are filtered hot.

On cooling, the filtrate deposits a yellowish-white solid. The residue from the filtration is extracted with water in order to obtain a further quantity of the product. The product is slightly soluble in cold water and readily so in hot, giving a faintly yellow solution. This can be purified in a similar manner to the product obtained from indigo and 5:5'-dibrom-6:6'-diethoxy-thio-indigo, and from caustic soda solution it can be obtained in a form which yields no ash on ignition. Material may be dyed by immersing it in this solution and subsequently developing in a bath containing an acid oxidizing agent whereby the original blue colour of the tetra-brom-indigo is regenerated.

*Example (xiii)*

This deals with the production of a derivative of brilliant indigo B. A. S. F. 2B with zinc, pyridine and methyl sulphuric acid chloride on the lines of the preceding examples. In this case a greenish white substance is obtained.

Class 2: Different Metals

Example (xiv)

This deals with Caledon jade green, iron, pyridine and methyl sulphuric acid chloride.

1 part of methyl sulphuric acid chloride is added to 6 parts of dry pyridine which is well stirred and cooled so that the temperature does not exceed 30°. An intimate mixture of 1 part of Caledon jade green powder (dimethoxy-dibenzanthrone) and 1 part of iron filings is then added. With continued cooling and stirring the addition of 2 parts of methyl sulphuric acid chloride is made at such a rate that the temperature of the melt does not exceed 50°. At the end of the addition the temperature is raised to 60° and kept at this for 2 hours with continued stirring. The crimson melt is worked up by pouring into 40 parts of cold water, whereby a reddish-violet solid is precipitated, containing the desired stable product. This may be extracted by hot water, in which case 1 part of chalk is added in order to keep the solution neutral, or by warm dilute soda, and from the resulting solutions the desired stable product may be salted out.

Example (xv)

This deals with Caledon jade green, cobalt, pyridine and methyl sulphuric acid chloride.

1 part of methyl sulphuric acid chloride is added to 7 parts of dry pyridine which is well stirred and cooled so that the temperature does not exceed 30°. An intimate mixture of 1 part of Caledon jade green powder (dimethoxy-dibenzanthrone) and 1 part of finely divided granular cobalt is then added. With continued cooling and stirring the addition of 2 parts of methyl sulphuric acid chloride is made at such a rate that the temperature of the melt does not exceed 50°. At the end of the addition the temperature is raised to 60° and kept at this for 2 hours with continued stirring. The resulting dark purple melt is worked up by adding to cold water, filtering off the precipitated solid and extracting with hot water, in which case either a little chalk or hot dilute alkali is added.

Example (xvi)

This deals with Caledon jade green, copper, pyridine and methyl sulphuric acid chloride.

1 part of methyl sulphuric acid chloride is added to 6 parts of dry pyridine which is well stirred and cooled, so that the temperature does not exceed 30°. An intimate mixture of 1 part of Caledon jade green powder (dimethoxy-dibenzanthrone) and 1 part of pure copper powder (98–99 per cent. copper content) is then added. With continued cooling and stirring 2 parts of methyl sulphuric acid chloride are added at such a rate that the temperature of the melt does not exceed 50°. At the end of the addition the temperature is raised to 60° and kept at this for 5 hours. The resulting bright crimson melt is allowed to cool and is then poured into 70 parts of cold water, whereby a tarry solid is precipitated. The aqueous layer is separated and the tarry residue extracted with warm soda solution whereby the stable soluble derivative is removed. To the soda extract salt is added whereby the stable product is separated as a dark purple solid.

Example (xvii)

This deals with Caledon jade green, aluminium, pyridine and methyl sulphuric acid chloride.

3 parts of methyl sulphuric acid chloride are added to 20 parts of dry pyridine which is well stirred and cooled so that the temperature does not exceed 30°. An intimate mixture of 3 parts of Caledon jade green powder (dimethoxy-dibenzanthrone) and 1.5 parts of aluminium powder are added. With continued cooling and stirring 6 parts of methyl sulphuric acid chloride are then added at such a rate that the temperature of the melt does not exceed 50°. The temperature is then raised to 60° and kept at this for 8 hours. The resulting dark purple melt is allowed to cool and is then stirred into 200 parts of cold water whereby a dark purple solid is precipitated. From this solid, which is removed by filtration, the desired stable product may be extracted by means of alcohol in the form of a purple-red solution. This solution may be added to water containing a small amount of alkali and used for dyeing cotton, wool, silk and artificial silk. The red shade may be developed to the ordinary shade of Caledon jade green by the use of acid oxidizing agents.

Example (xviii)

This deals with Caledon jade green, cadmium, pyridine and methyl sulphuric acid chloride.

1 part of methyl sulphuric acid chloride is added to 6 parts of dry pyridine which is well stirred and cooled so that the temperature does not exceed 30°. An intimate mixture of 1 part of Caledon jade powder (dimethoxy-dibenzanthrone) and 2 parts of cadmium filings is then added. With continued cooling and stirring the addition of 2 parts of methyl sulphuric acid chloride is made at such a rate that the temperature of the melt does not exceed 50°. At the end of the addition the temperature is raised to 60° and kept at this for 3 hours with continued stirring. The resulting dark crimson melt is allowed to cool and is then stirred into 70 parts of cold water whereby a dark purple solid is precipitated. This is removed by filtration and the stable soluble product may be extracted from it either with boiling water with the addition of 1 part of chalk or hot dilute sodium hydroxide.

*Example (xix)*

This deals with Caledon jade green, tin, pyridine, and methyl sulphuric acid chloride.

3 parts of Caledon jade green powder (dimethoxy-dibenzanthrone), 3 parts of finely divided tin and 30 parts of dry pyridine are mixed together by stirring in a vessel provided with a cooling jacket. 8 parts of methyl sulphuric acid chloride are then added at such a rate that the temperature of the mixture does not exceed 30°. At the end of the addition the dark purple melt is poured into 300 parts of cold water which is vigorously stirred. The granular precipitate is filtered off and extracted by means of hot water in the presence of chalk or by means of hot dilute alkali. From the extracts thus obtained the required dyestuff is salted out in the usual manner.

*Example (xx)*

This deals with Caledon jade green, antimony, pyridine and methyl sulphuric acid chloride:

1 part of methyl sulphuric acid chloride is added to 7 parts of dry pyridine which is well stirred and cooled so that the temperature does not exceed 30°. An intimate mixture of 1 part of Caledon jade green powder (dimethoxy-dibenzanthrone) and 2 parts of finely divided antimony is added. With continued cooling and stirring the addition of 2 parts of methyl sulphuric acid chloride is made at such a rate that the temperature does not exceed 50°. At the end of the addition the temperature is raised in the course of half an hour to 60–65° and kept at this for 1½ hours with continual stirring. The resulting dark purple melt is poured into cold water. A dull purple granular solid is thereby precipitated. This solid is slightly soluble in cold water to a purple solution which eventually changes after standing for a few days to a suspension of regenerated Caledon jade green. In order to obtain the soluble stable product in a convenient form, the dull purple granular solid, which in its crude form appears to be unstable, is extracted either with hot water in the presence of chalk or with hot dilute alkali. From the extract thus obtained the stable soluble product may be salted out by the addition of common salt.

*Example (xxi)*

This deals with Caledon jade green, copper-bronze, pyridine and methyl sulphuric acid chloride.

1 part of Caledon jade green powder (dimethoxy-dibenzanthrone), 1 part of copper-bronze powder, 1 part of anhydrous zinc chloride and 10 parts of dry pyridine are mixed together and well stirred. While the mixture is cooled with cold water 2.7 parts of methyl sulphuric acid chloride are added at such a rate that the temperature does not exceed 30°. The resulting dark purple melt is poured into water by which is precipitated a dark purple solid from which the required stable compound is extracted by warm dilute soda.

*Example (xxii)*

This deals with Caledon jade green, a mixture of zinc and iron as the metal dust, pyridine and methyl sulphuric acid chloride.

1 part of Caledon jade green powder (dimethoxy-dibenzanthrone), 0.5 part of zinc and 0.5 part of reduced iron are mixed with 8 parts of pyridine and well stirred while the mixture is cooled with cold water. 2.7 parts of methyl sulphuric acid chloride are then added at such a rate that the temperature of the melt does not exceed 30°. The brilliant red melt is poured into 80 parts of cold water whereby a dark purple solid is precipitated, from which the required soluble stable product may be extracted by hot water or by warm dilute alkali.

CLASS 3: DIFFERENT ALKYLATED SULPHURIC ACID CHLORIDES

*Example (xxiii)*

This deals with Caledon jade green, zinc, pyridine and ethyl sulphuric acid chloride.

3 parts of ethyl sulphuric acid chloride are slowly run into 20 parts of dry light pyridine during cooling and stirring. An intimate mixture of 3 parts of Caledon jade green powder (dimethoxy-dibenzanthrone) and three parts zinc dust is added and a further 6 parts of ethyl sulphuric acid chloride slowly run into the reaction mixture during stirring and cooling, the temperature being maintained at about 40–45°. Thereafter the dark purple melt is poured into 200 parts of cold water and the mixture filtered whereby a dark red product is obtained. The required soluble product is obtained by extracting this product with hot water containing a little suspended chalk. The soluble derivative gives a bright red solution which dyes cotton, wool and silk brilliant orange-red shades which may be developed to the original green by immersion in a bath containing an acid oxidizing agent.

*Example (xxiv)*

This deals with Caledon yellow G and other flavanthrones, zinc, pyridine and ethyl sulphuric acid chloride.

15 parts of ethyl sulphuric acid chloride are slowly added to 30 parts of dry light pyridine during stirring and cooling. A mixture of 5 parts of powdered flavanthrone and 3 parts of zinc dust is then added and the temperature maintained at 50° for 15 to 30 minutes. The dark blue-black melt is poured into 300 parts of cold water and filtered whereby a dark blue-green solid is obtained which is readily soluble in dilute caustic soda solution, giving a brilliant blue-violet solution which dyes cotton, wool and silk bright blue-violet shades. The original flavanthrone yellow may be developed by immersion in a bath containing an acid oxidizing agent.

Example (xxv)

This deals with indigo, zinc, pyridine and ethyl sulphuric acid chloride.

7½ parts of ethyl sulphuric acid chloride are added to 40 parts of dry light pyridine. An intimate mixture of 4 parts powdered indigo and 6 parts of zinc dust is added. 18 parts of ethyl sulphuric acid chloride are slowly run in. The reaction mixture is stirred vigorously and cooled in a freezing mixture of ice and salt. After all the ethyl sulphuric acid chloride is added the melt is slowly raised to 55° and maintained at this temperature for 15 minutes. After cooling the mixture is poured into 200 parts of cold water and sufficient sodium carbonate added to make the mixture just alkaline. The pyridine is removed by distillation in steam and the residue from the steam distillation filtered hot. On cooling, yellow, needle-shaped crystals are deposited. The residue from the filtration is extracted with hot water whereby more product is obtained. The yellow, needle-shaped crystals are sparingly soluble in cold water but readily soluble in hot, giving a faintly yellow solution. The product appears to be the ethyl pyridinium salt of the disulphuric acid ester of indigo with the following constitution—

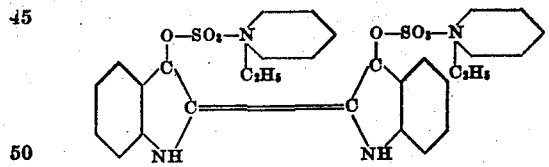

Material may be dyes by immersing it in this solution and subsequently developing in a bath containing an acid oxidizing agent whereby the original blue shade of indigo is regenerated.

CLASS 4: DIFFERENT TERTIARY ORGANIC BASES AND DILUENTS

Example (xxvi)

This deals with indigo, zinc, dimethyl-aniline and methyl sulphuric acid chloride.

7½ parts of methyl sulphuric acid chloride are added to 40 parts of dry dimethyl-aniline. To this is added an intimate mixture of 4 parts of powdered indigo and 6 parts of zinc dust, and a further 15 parts of methyl sulphuric acid chloride slowly run in. The reaction mixture is stirred vigorously and cooled in a freezing mixture of ice and salt. After all the methyl sulphuric acid chloride is added the temperature is slowly raised to 55° and stirring continued for 15 minutes. The melt is poured into 200 parts of cold water and sufficient sodium carbonate added to make the mixture just alkaline. The dimethyl-aniline is removed by steam distillation and the residue from the distillation filtered hot. The pale yellowish-green filtrate contains the soluble product which is deposited on cooling in the form of pale yellow crystals. Material may be dyed by immersing it in a solution of the product and subsequently treating with an acid oxidizing agent, whereby the blue indigo shades are developed.

Example (xxvii)

This deals with Caledon jade green, zinc, quinaldine and methyl sulphuric acid chloride.

1 part of methyl sulphuric acid chloride is added to 10 parts of dry quinaldine (alpha-methyl-quinoline), the mixture being well cooled in water and stirred. 1 part of zinc dust and 1 part of Caledon jade green powder (dimethoxy-dibenzanthrone) intimately mixed are then added. 2 parts of methyl-sulphuric acid chloride are now added at such a rate that the temperature of the melt rises by the end of the addition to 55–60°, cooling being dispensed with. The temperature is kept at 60° for about half an hour. The dark crimson melt is added to 100 parts of cold water containing a small excess of sodium carbonate and steam distilled in order to remove the quinaldine. At the end of the steam distillation, which of necessity lasts a long time on account of the difficulty in removing the quinaldine, the blackish solid remaining is separated from the liquid by filtration, and extracted with boiling 1 per cent. soda solution. The alkaline extract is treated with common salt, about 10 grams per 100 grams of solution, whereby a purple solid is precipitated. The purple solid is somewhat soluble in boiling water, more so in boiling alkali. With its aqueous or alkaline solution, dyeing may be conducted in the ordinary way in which case the fabric is dyed a salmon pink shade which is developed to that of the original jade green by suitable acid oxidizing agents.

Example (xxviii)

This deals with indigo, zinc, quinoline and methyl sulphuric acid chloride.

4 parts of methyl sulphuric acid chloride are added to 21 parts of dry pyridine which is well stirred and cooled so that the temperature does not exceed 30°. An intimate mixture of 2 parts of indigo powder and 3 parts of zinc dust is then added. With continued cooling and stirring 8 parts of methyl sulphuric acid chloride are then added at such a rate that the temperature of the melt does not exceed 50°. At the end of the addition, the temperature is slowly raised to 55° and is kept at this temperature for 1 hour. The resulting dirty blue melt is added to cold water containing a slight excess of sodium carbonate, and steam distilled as rapidly as possible until all the quinoline is removed. By filtration of the resulting hot mixture a brown-yellow filtrate is obtained containing the desired stable product which separates out on the addition of salt. The stable soluble derivative dissolves in warm water and dilute soda. Cotton, wool, silk and artificial silk may be padded with this in concentrated solution whereby they are dyed a light reddish-brown which may be developed to indigo blue with suitable acid oxidizing agents.

*Example (xxix)*

This deals with Caledon yellow G, zinc, a mixture of pyridine and chlor-benzene and methyl sulphuric acid chloride.

An intimate mixture of 3 parts of flavanthrone and 3 parts zinc dust are added to 15 parts of dry light pyridine mixed with 16.5 parts of chlor-benzene. The mixture is stirred vigorously and 12 parts of methyl sulphuric acid chloride slowly added. When all the latter has been added the melt is stirred for a further 2 hours and then poured into water which causes the precipitation of the dyestuff in the form of a dark blue-green precipitate. This is separated by filtration. It is insoluble in water, but readily soluble in dilute caustic soda solution to a brilliant blue-violet solution which dyes cotton and wool bright blue-violet shades which are developed to the original flavanthrone yellow by immersion in a bath containing an acid oxidizing agent.

*Example (xxx)*

This deals with Caledon blue R, zinc, pyridine, carbon disulphide and methyl sulphuric acid chloride.

An intimate mixture of 3 parts powdered indanthrone (N-dihydro-1:2':2:1'-anthraquinone-azine), 2 parts of zinc dust and 3 parts of crystalline stannous chloride are added to 30 parts of dry light pyridine. The mixture is stirred vigorously and 10 parts of methyl sulphuric acid chloride mixed with 13 parts of carbon disulphide are then slowly added and the mixture heated on a water bath under reflux. The mixture is then poured into cold water whereby the dyestuff is precipitated and is separated from the pyridine-water liquor by filtration. Purification of the product is effected by dissolving in hot 1 per cent. caustic soda solution, cooling and precipitating by adding salt to the solution. The product is a red-violet solid which dissolves in water, giving a deep red solution which dyes wool and silk bright red-violet shades which when developed in a bath containing an acid oxidizing agent yields the original blue of indanthrone.

*General*

As indicated by the examples the invention is not limited to the use of zinc dust or methyl sulphuric acid chloride. Any suitable metallic dust such as copper, especially copper bronze, for instance, may be used and any other alkyl sulphuric acid chloride such as ethyl sulphuric acid chloride may be used. The organic base may be any suitable tertiary organic base besides pyridine, for instance quinoline or dimethyl-aniline or a homologue or substitution product of this type of base. Among the substances which may be dyed effectively by the above process may be noted cotton, wool, natural and artificial silk and straw.

Dyeing compounds produced by the above described processes are in general stable to air slightly soluble in cold water and more soluble in hot water, soluble in dilute alkali and in some cases are also soluble in dilute acids.

It is difficult to establish what is the constitution of the primary reaction products in the above described processes for producing dyeing compounds and it is unnecessary for the purposes of the present invention to decide this but up to the present we are not aware of any actual facts indicating that they are alkyl sulphuric esters. In the case of indigo, for instance, the facts appear to be quite conclusive that the primary product is not an alkyl sulphuric ester but a methyl pyridinium derivative of indigo sulphuric acid.

Dyeing compounds prepared as herein described may be used for printing and for the direct dyeing of fabrics by hydrolysis and oxidation on the fibres.

Printing of the products of this invention may be effected by making the desired proportion of that dyestuff derivative for instance 3 parts into a thin paste with 27 parts of a 5% solution of caustic soda and then well mixing with 70 parts of a thickening containing one part of British gum to one part of water. The resulting paste is printed on to textile material in the usual manner, dried, steamed and then treated in an oxidizing bath composed for example of acid ferric chloride.

In the examples given above, reference has been made specifically to benzanthrone derivatives, indanthrone, flavanthrone, pyranthrone, anthraquinone-acridone, indigoid and indigo as types of vat dyestuffs.

The process of the invention is however general, and applicant knows of no exception among the vat dyestuffs.

Having now described my invention, what I claim as new and desire to secure by Letters Patent is:—

1. A process for the preparation of dye materials which comprises treating vat dyestuffs selected from the anthraquinone, indigo, indigoid, halogenated indigo, thio-indigo, pyranthrone, flavanthrone and dibenzanthrone series with an alkyl sulphuric acid halide in the presence of a metal selected from aluminium, zinc, cadmium, iron, cobalt, tin, antimony, copper and a liquid organic tertiary base.

2. A process as claimed in claim 1 in which there is also present an inert organic diluent.

3. A process as claimed in claim 1 in which the liquid tertiary organic base employed is pyridine.

4. A process as claimed in claim 1 in which the metal used is in the form of a powder.

5. A process for the preparation of dye materials which comprises treating dimethoxy-dibenzanthrone with an alkyl sulphuric acid halide in the presence of a metal selected from aluminium, zinc, cadmium, iron, cobalt, tin, antimony, copper, and a liquid tertiary organic base.

6. The process which consists in the treatment of a dry vat dyestuff with a metal selected from aluminium, zinc, cadmium, iron, cobalt, tin, antimony, copper, and a liquid tertiary organic base simultaneously with treatment with an alkyl sulphuric acid halide.

7. The process which consists in the addition of an alkyl sulphuric acid halide to a mixture of a vat dyestuff, a metal selected from aluminium, zinc, cadmium, iron, cobalt, tin, antimony, copper, and a liquid tertiary organic base.

8. A process for the production of a dyeing compound which consists in treating a vat dyestuff with an alkyl sulphuric acid halide in the presence of a metal selected from aluminium, zinc, cadmium, iron, cobalt, tin, antimony, copper, and a liquid tertiary organic base.

9. A process for the production of a dyeing compound which consists in treating a vat dyestuff of the anthraquinone series with an alkyl sulphuric acid halide in the presence of a metal selected from aluminium, zinc, cadmium, iron, cobalt, tin, antimony, copper, and a liquid tertiary organic base.

10. A process for the production of a dyeing compound which consists in treating a vat dyestuff with an alkyl sulphuric acid halide in the presence of a metal selected from aluminium, zinc, cadmium, iron, cobalt, tin, antimony, copper, and a liquid tertiary organic base followed by alkaline extraction by alkali.

11. A process for the preparation of dye materials which comprises treating vat dyestuffs selected from the anthraquinone, indigo, indigoid, halogenated indigo, thioindigo, pyranthrone, flavanthrone, dibenzanthrone and iso-dibenzanthrone series with an alkyl sulphuric acid halide in the presence of a metal selected from aluminium, zinc, cadmium, iron, cobalt, tin, antimony, copper, and a liquid tertiary organic base.

12. A process of producing coloured shades on textile fibres by exposing the said fibres to the action of a form of colouring matter soluble in hot water obtained by treating a vat dyestuff in a tertiary organic base in the presence of a metal with an alkyl sulphuric acid halide and then submitting the dyed fibres to the action of an acid oxidizing agent whereby the original shade of the dyestuff is re-formed.

13. A process according to claim 10 applied to vat dyestuffs of the anthraquinone series.

14. A process according to claim 10 applied to vat dyestuffs of the benzanthrone series.

15. A process for the preparation of dye materials which comprises treating dimethoxy-dibenzanthrone with a methyl sulphuric acid chloride in the presence of zinc dust and a tertiary organic base.

16. A process for the preparation of dye materials which comprises treating dimethoxy-dibenzanthrone with a methyl sulphuric acid chloride in the presence of zinc dust and of a tertiary organic base, cooling the reaction mixture after the reaction is completed, adding water to said cooled mixture in order to precipitate the product and thereafter extracting said product with a dilute aqueous alkali.

17. A process for the preparation of dye materials which comprises treating dimethoxy-dizenzanthrone with methyl sulphuric acid chloride in the presence of zinc dust and a tertiary organic base, cooling the reaction mixture after the reaction is completed, adding water to said cooled mixture in order to precipitate the product and thereafter extracting said product with a solvent.

18. As a new material, the dyestuff obtainable by the process of claim 16, which substance is a red solid readily soluble in water, from which solution cotton, wool, silk and artificial silk are dyed salmon pink and red shades.

19. A process for the production of a dyeing compound which consists in treating a vat dyestuff with an alkyl sulphuric acid halide in the presence of a metal selected from aluminium, zinc, cadmium, iron, cobalt, tin, antimony, or copper and a liquid tertiary organic base.

In testimony whereof I have signed my name to this specification.

JOHN EDMUND GUY HARRIS.